United States Patent
Kodama et al.

(10) Patent No.: US 7,792,199 B2
(45) Date of Patent: Sep. 7, 2010

(54) MULTI-CARRIER COMMUNICATION APPARATUS, INTEGRATED CIRCUIT, MULTI-CARRIER COMMUNICATION SYSTEM, AND MULTI-CARRIER COMMUNICATION METHOD

(75) Inventors: Nobutaka Kodama, Fukuoka (JP); Hisao Koga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 903 days.

(21) Appl. No.: 11/526,801

(22) Filed: Sep. 26, 2006

(65) Prior Publication Data

US 2007/0071124 A1    Mar. 29, 2007

(30) Foreign Application Priority Data

Sep. 27, 2005    (JP)    ............................. 2005-280095

(51) Int. Cl.
*H04K 1/10*    (2006.01)
(52) U.S. Cl. ...................................................... 375/260
(58) Field of Classification Search ................. 375/149, 375/150, 152
See application file for complete search history.

(56) References Cited

U.S. PATENT DOCUMENTS

| | | | |
|---|---|---|---|
| 5,497,398 A | 3/1996 | Tzannes et al. | |
| 5,631,610 A | 5/1997 | Sandbert et al. | |
| 5,636,246 A | 6/1997 | Tzannes et al. | |
| 5,995,539 A | 11/1999 | Miller | |
| 6,532,256 B2 | 3/2003 | Miller | |
| 6,549,520 B1 | 4/2003 | Gross et al. | |
| 6,944,232 B2 | 9/2005 | Koga et al. | |
| 2001/0033612 A1 | 10/2001 | Peeters | |
| 2003/0048837 A1* | 3/2003 | Sakai et al. | ................. 375/224 |
| 2003/0156014 A1 | 8/2003 | Kodama et al. | |
| 2004/0057529 A1 | 3/2004 | Koga et al. | |
| 2004/0120413 A1* | 6/2004 | Park et al. | .................... 375/260 |
| 2004/0184400 A1 | 9/2004 | Koga et al. | |

(Continued)

FOREIGN PATENT DOCUMENTS

EP    1039715    8/2002

(Continued)

OTHER PUBLICATIONS

H. S. Malvar: "Signal Processing with Lapped Transforms" Chapter 5, Modulated Lapped Transforms, Universidade de Brasilia, Brazil, ARTECH House, Inc, 1992, pp. 175-212.

(Continued)

*Primary Examiner*—Kevin Y Kim
(74) *Attorney, Agent, or Firm*—Dickinson Wright PLLC (57) ABSTRACT

A digital transmission signal from a digital signal processing unit is converted to an analog signal in an analog circuit, and is transmitted from transmission lines via a communication transformer. The digital signal processing unit includes a time carrier detector that detects existence or non-existence of a carrier by using a temporal waveform of a reception signal, a frequency carrier detector that detects existence or non-existence of a carrier by using frequency characteristics of the reception signal, and an amplitude carrier detector that detects existence or non-existence of a carrier by using a frequency spectrum of the reception signal. Under the control of a controller, carrier detection is performed by switching between the time carrier detector, the frequency carrier detector and the amplitude carrier detector for activation.

17 Claims, 9 Drawing Sheets

U.S. PATENT DOCUMENTS

| | | |
|---|---|---|
| 2005/0008086 A1 | 1/2005 | Koga et al. |
| 2005/0031048 A1 | 2/2005 | Koga et al. |
| 2005/0037722 A1 | 2/2005 | Koga et al. |
| 2005/0077889 A1* | 4/2005 | Toporski et al. .......... 324/76.19 |
| 2005/0238089 A1 | 10/2005 | Kodama et al. |
| 2005/0238109 A1 | 10/2005 | Koga et al. |
| 2006/0133528 A1 | 6/2006 | Koga et al. |

FOREIGN PATENT DOCUMENTS

| | | |
|---|---|---|
| JP | 2000 278237 | 10/2000 |
| JP | 2001 094527 | 4/2001 |
| JP | 2003 218831 | 7/2003 |
| JP | 2005 037722 | 2/2005 |
| JP | 2005 057644 | 3/2005 |

OTHER PUBLICATIONS

M.C. Sun, et al.: "Power-Line Communications using DWMT Modulation", 2002 IEEE International Symposium on Circuits and Systems, vol. 4, May 26-29, 2002, pp. 493-496, XP002271367.

* cited by examiner

MULTI-CARRIER COMMUNICATION APPARATUS, INTEGRATED CIRCUIT, MULTI-CARRIER COMMUNICATION SYSTEM, AND MULTI-CARRIER COMMUNICATION METHOD

BACKGROUND

1. Field of Invention

The embodiment described below relates to a multi-carrier communication apparatus, an integrated circuit, a multi-carrier communication system, and a multi-carrier communication method, in which communication is performed by using a plurality of carriers.

2. Description of Related Art

A transmission method using a plurality of sub-carriers, such as an OFDM (Orthogonal Frequency Division Multiplexing) method, has a major advantage that high quality communication is possible even when the communication is performed through a rough transmission line, and has been used for not only wireless communication but also wired communication such as power line communication.

A multi-carrier communication apparatus that performs such communication by using a plurality of sub-carriers transmits transmission bit data on a transmitting side by converting the bit data to symbol data; performing a symbol mapping according to the symbol data; converting the data to time-domain data via an inverse FFT transform or an inverse wavelet transform; performing a parallel-serial transform; and converting the data to a base-band analog signal via a DA conversion. The multi-carrier communication apparatus receives reception bit data on a receiving side by converting a received signal to a digital signal via an AD conversion; performing a serial-parallel transform; converting the data to frequency-domain data via an FFT transform or a wavelet transform; and performing a demapping.

Such multi-carrier communication apparatus has a carrier detection function that determines whether another apparatus is transmitting a signal to a transmission line, and performs a transmission process when another apparatus is not using the transmission line and a transmission request is received.

Carrier detection of the multi-carrier communication apparatus, as shown in Japanese Laid-Open Patent Publication 2001-94527, for example, is performed based on an AD-converted reception signal. As shown in US 2005-037722 A1, carrier detection may also be performed based on a signal obtained by converting AD-converted digital data to frequency-domain data.

In the case where carrier detection is performed based on an AD-converted reception signal, correlation of a signal in a time domain is used, and carrier detection can be generally realized by using a simple circuit or by performing a simple data processing. Carrier detection based on a signal that has been converted to frequency-domain data uses correlation between sub-carriers in a frequency domain, and therefore has high detection accuracy.

However, these methods of carrier detection are all based on correlations of signals existing on the transmission line, so that a carrier may not be detected even when a signal exists on the transmission line. Therefore, communication may not be performed for a long period of time when signal collision occurs due to nearly simultaneous transmission of data from different terminals to the same transmission line.

FIGS. 10(a)-10(b) and FIGS. 11(a)-11(b) are time charts explaining signal collisions. In the case where transmission signals are simultaneously output from terminal A and terminal B at time t1 shown in FIG. 10(a), the signals are not received normally by other terminals. Therefore, terminal A, which terminated transmission at time t2, intends to retransmit, because there is no response to the transmitted signal. In such case, a carrier often cannot be detected, so that it is determined that there is no signal on the transmission line, and retransmission starts at time t3. Therefore, recollision occurs. This is because the transmission signal (the portion marked by the broken-line ellipse in FIGS. 10(a) and 10(b)) from terminal B, which exists on the transmission line during a period of time near time t3, corresponds to a payload portion of the transmission data, in which there is usually no correlation. Depending on the lengths of the transmission signals of terminal A and terminal B, the signal recollision can also occur at time of retransmission from terminal B, and further can also occur consecutively.

Figure 10A:
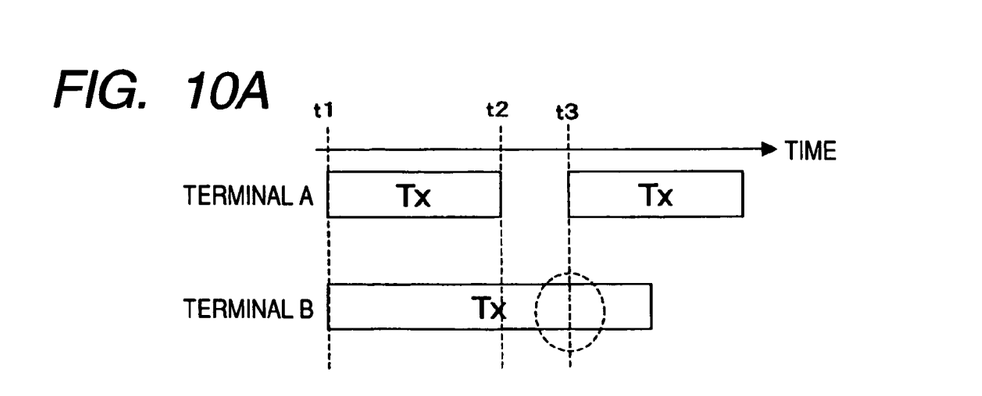
FIGS. 10(a) and 10(b) are time charts explaining collisions in an example of a conventional multi-carrier communication system.
Figure 10B:
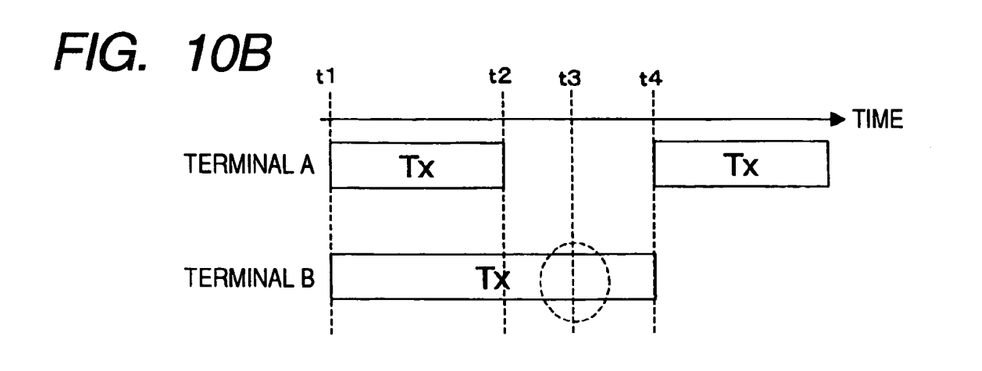

In the case where a carrier is detected when terminal A intends to retransmit at time t3, as FIG. 10(b) shows, retransmission of the signal is not performed at time t3; the retransmission is performed at time t4 after terminal B terminated signal transmission, thereby, causing no signal recollision.

Figure 11A:
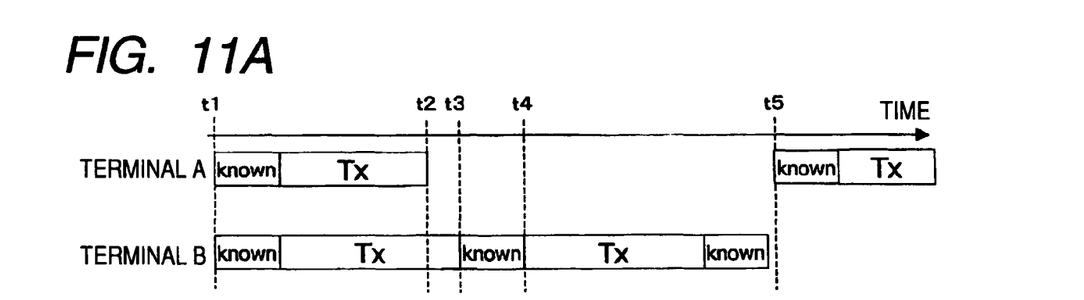
FIGS. 11(a) and 11(b) are time charts explaining collisions in another example of a conventional multi-carrier communication system.
Figure 11B:
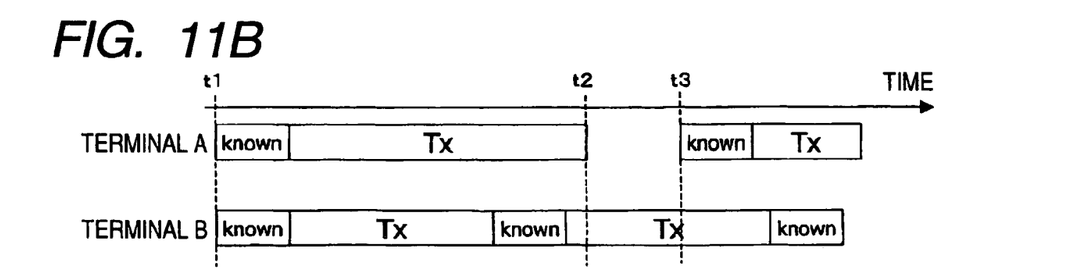

As shown in FIGS. 11(a) and 11(b), the rate of occurrence of the above-described recollision can be reduced when transmission is performed by inserting a known signal (a signal with correlation, indicated by "known" in FIGS. 11(a) and 11(b)) into the payload portion of the transmission data. In the case where transmission signals are simultaneously output from terminal A and terminal B at time t1 as shown in FIG. 11(a), the signals are not received normally by other terminals. Therefore, terminal A, which terminated transmission at time t2, intends to retransmit, because there is no response to the transmission signal. In the example shown in FIG. 11(a), the transmission signal from terminal B is a signal with correlation during the period of time between time t3 and time t4, which coincides with when terminal A intends to retransmit and performs carrier detection, retransmission is therefore not performed. Retransmission is performed at time t5 without performing carrier detection.

However, in the case where terminal A and terminal B transmit with a timing as shown in FIG. 11(b), transmission data of terminal B do not contain a signal with correlation during the period of time between time t2 and time t3. Terminal A therefore retransmits at time t3 without performing carrier detection, and recollision occurs. In other words, without inserting signals with correlation into transmission data at narrow intervals, it is not possible to surely reduce the rate of recollision. Therefore, reducing the rate of recollision causes degradation of transmission efficiency.

SUMMARY

The purpose of the embodiment described below is to address the above-described problem, and to provide a multi-carrier communication apparatus, an integrated circuit, a multi-carrier communication system and a multi-carrier communication method, which are capable of reducing a rate of missed carrier detections without causing degradation of transmission efficiency.

The multi-carrier communication apparatus performs multi-carrier communication, and includes a frequency spectrum detector and a determinating unit. The frequency spectrum detects a frequency spectrum of a reception signal, the frequency spectrum indicating an amplitude corresponding to a frequency. The determinating unit determines, based on the amplitude of the frequency used for the communication, whether a carrier exists in the reception signal. The multi-carrier communication apparatus is capable of reducing the rate of missed carrier detections without degrading transmission efficiency. Therefore, even when signal collision occurs, it is possible to avoid a situation in which communication cannot be performed for a long period of time.

The integrated circuit includes a frequency spectrum detector and a determinating unit. The frequency spectrum detects a frequency spectrum of a reception signal, the frequency spectrum indicating an amplitude corresponding to a frequency. The determinating unit determines, based on the amplitude of the frequency used for the communication, whether a carrier exists in the reception signal.

The multi-carrier communication method is for performing multi-carrier communication, and includes detecting a frequency spectrum and determining whether a carrier exists in the reception signal. In the frequency spectrum detection, a frequency spectrum of a reception signal is detected, the frequency spectrum indicating an amplitude corresponding to a frequency. In the determination, whether a carrier exists in the reception signal is determined, based on the amplitude of the frequency used for the communication.

According to the above, the multi-carrier communication apparatus and the multi-carrier communication system, which are capable of reducing the rate of missed carrier detection without degrading transmission efficiency, can be provided.

DETAILED DESCRIPTION

In the following, an embodiment is explained with reference to the drawings.

Figure 1:
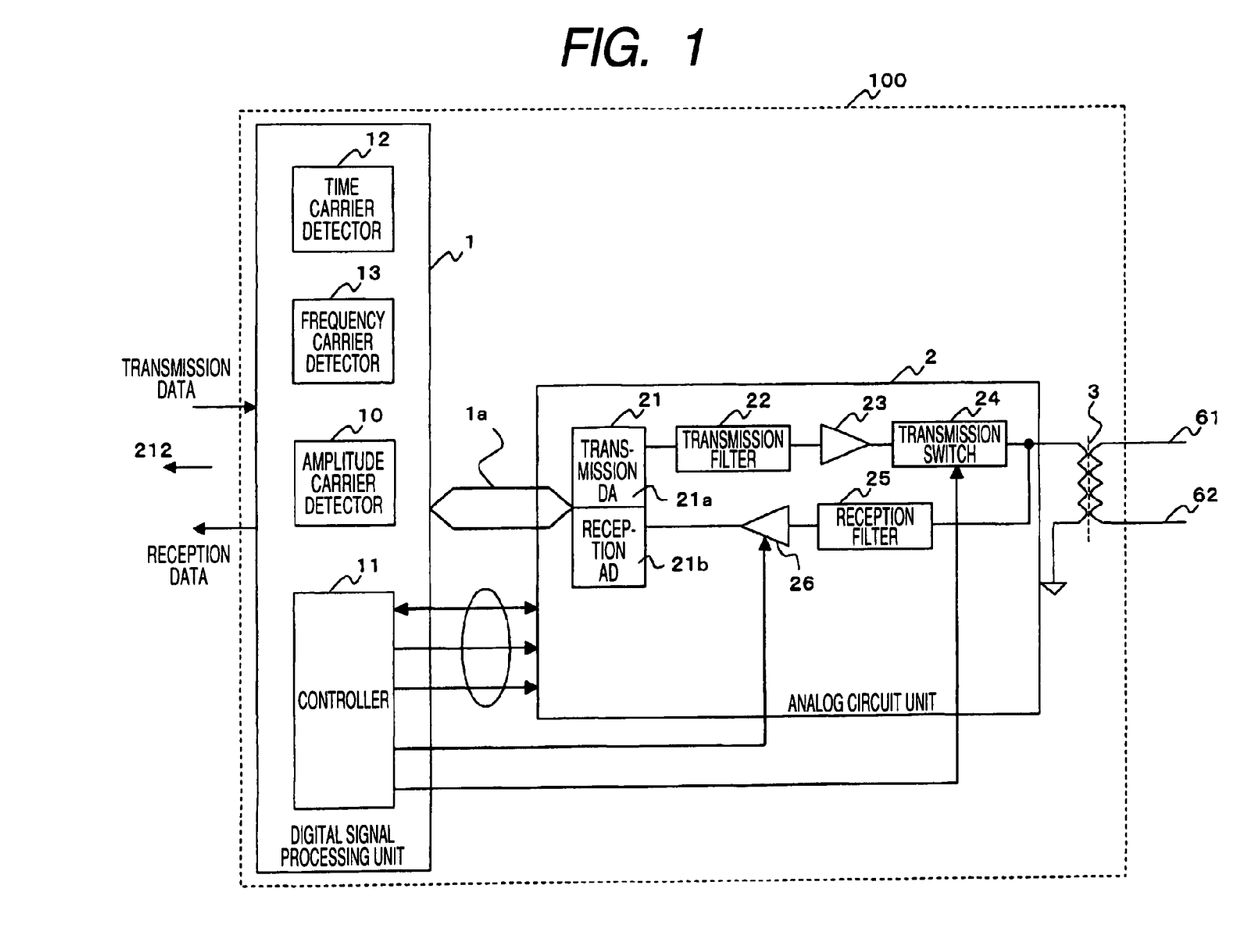
FIG. 1 shows a schematic configuration of a multi-carrier communication apparatus according to an embodiment.

FIG. 1 shows a schematic configuration of a multi-carrier communication apparatus according to the embodiment. Multi-carrier communication apparatus 100 of FIG. 1 performs communication via a transmission line including a pair of conductors such as a power line 61 and 62. Multi-carrier communication apparatus 100 of FIG. 1 includes digital signal processing unit 1, analog circuit unit 2, and communication transformer 3.

Digital signal processing unit 1, which includes, for example, one digital LSI or a plurality of digital LSIs, generates a digital transmission signal by modulating digital transmission data, and generates digital reception data by demodulating a digital reception signal. Digital signal processing unit 1 also performs control over a signal path, a gain and the like for each unit of analog circuit unit 2. Analog circuit unit 2 includes an analog chip and a discrete component. Digital transmission signal 1a is transmitted to AD/DA conversion circuit 21 of analog circuit unit 2. Digital reception signal 1a is input from AD/DA conversion circuit 21. Control and status signals 1b are also input to or output from analog circuit unit 2. A modulation or demodulation process of digital signal processing unit 1 uses a plurality of sub-carriers, such as OFDM (Orthogonal Frequency Division Multiplexing) using a wavelet transform. The wavelet transform of communication generally includes a cosine modulated filter bank.

Digital signal processing unit 1 includes time carrier detector 12, frequency carrier detector 13, amplitude carrier detector 10, and controller 11. Time carrier detector 12 detects existence or non-existence of a carrier by using a temporal waveform of a reception signal. Frequency carrier detector 13 detects existence or non-existence of a carrier by using frequency characteristics of a reception signal. Amplitude carrier detector 10 detects existence or non-existence of a carrier by using a frequency spectrum of a reception signal. The frequency spectrum indicates an amplitude, which is power or voltage, corresponding to a frequency. Controller 11 performs control of the entire communication apparatus including carrier detection control for switching between time carrier detector 12, frequency carrier detector 13, and amplitude carrier detector 10 for activation.

Figure 5:
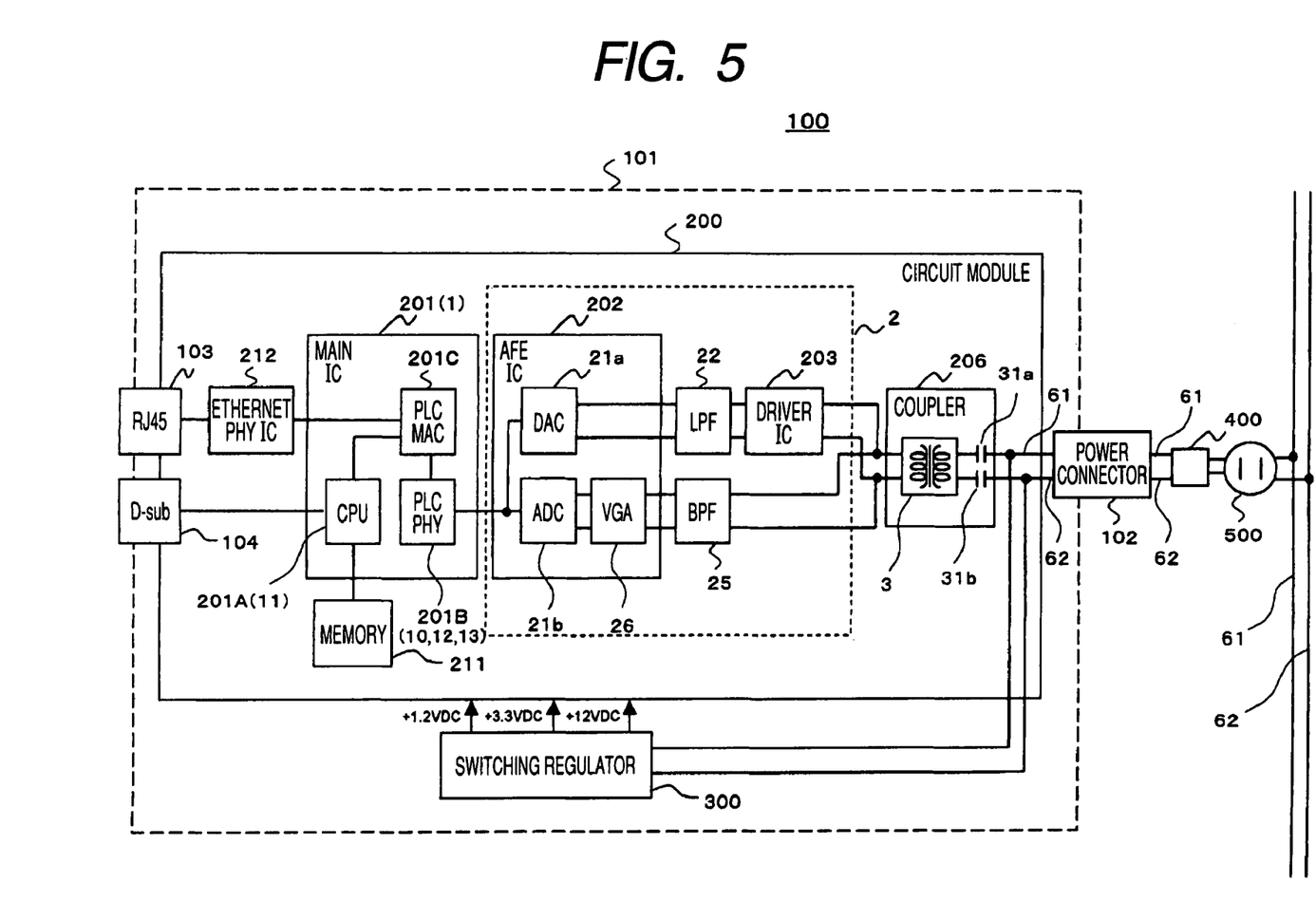
FIG. 5 is a block diagram showing an example of hardware of the multi-carrier communication apparatus according to the embodiment.

Digital signal processing unit 1 is substantialized by main IC 201 described later. Controller 11 is substantialized by CPU 201A of main IC 201. Further, amplitude carrier detector 10, time carrier detector 12, and frequency carrier detector 13 are substantialized by PLC PHY block 201B of main IC 201.

Analog circuit unit 2 includes AD/DA conversion circuit 21, transmission filter 22, transmission amplifier 23, transmission switch 24, reception filter 25, and reception AGC (Auto Gain Control) amplifier 26.

AD/DA conversion circuit 21 includes transmission DA converter 21a and reception AD converter 21b. Transmission DA converter 21a converts digital transmission signal 1a from digital signal processing unit 1 to an analog transmission signal. Reception AD converter 21b converts an analog reception signal from reception AGC amplifier 26 to a digital reception signal. Transmission filter 22 is a low-pass filter for eliminating high frequency noise generated by the DA conversion of transmission DA converter 21a. Transmission amplifier 23 amplifies transmission power of an analog transmission signal. Transmission switch 24, which performs switching of transmission and reception signals, mutes transmission amplifier 23 during reception, and switches impedances between transmitting and receiving.

Reception filter 25 is a band-pass filter for eliminating noise of frequencies outside a communication band. Reception AGC amplifier 26 amplifies an analog reception signal, and adjusts the analog reception signal to a voltage suited to a resolution of reception AD converter 21b.

Communication transformer 3 performs transmission and reception of signals by insulating communication signals to a primary circuit on the multi-carrier communication apparatus side and a secondary circuit on the transmission line side.

Figure 2:
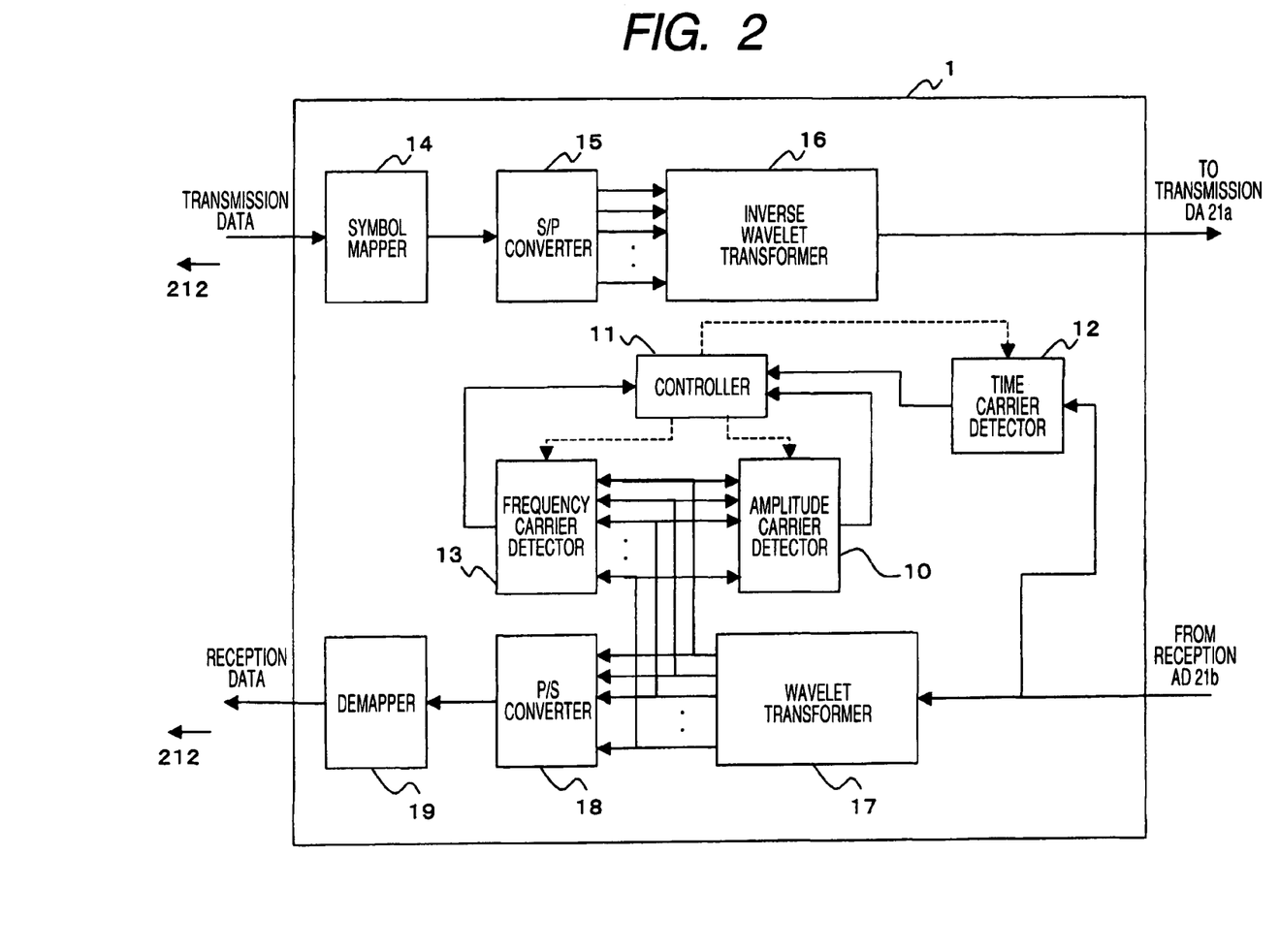
FIG. 2 shows a schematic configuration of a digital signal processing unit of the multi-carrier communication apparatus according to the embodiment.

FIG. 2 shows a schematic configuration of digital signal processing unit 1. In addition to controller 11, time carrier detector 12, frequency carrier detector 13, and amplitude carrier detector 10, digital signal processing unit 1 includes symbol mapper 14, serial-parallel converter (S/P converter) 15, inverse wavelet transformer 16, wavelet transformer 17, parallel-serial converter (P/S converter) 18, and demapper 19.

Symbol mapper 14 converts bit data to be transmitted to symbol data and performs symbol mapping (for example, PAM (Pulse Amplitude Modulation)) according to each packet of symbol data. S/P converter 15 converts mapped serial data to parallel data. Inverse wavelet transformer 16 transforms parallel data to an inverse wavelet as time-domain data, and generates a sampling value sequence representing a transmission symbol. The data are transmitted to transmission DA converter 21a of analog circuit unit 2.

Wavelet transformer 17 transforms reception digital data obtained from reception AD converter 21b of analog circuit unit 2 (a sampling value sequence sampled at the same sampling rate as transmitted) to a discrete wavelet on a frequency domain. P/S converter 18 converts parallel data on the frequency domain to serial data. Demapper 19 obtains reception data by calculating an amplitude value for each sub-carrier and performing reception signal determination.

Time carrier detector 12 detects existence or non-existence of a carrier by using a temporal waveform of a reception signal obtained from AD/DA conversion circuit 21 of analog circuit unit 2. Specifically, existence or non-existence of a carrier is detected by obtaining a correlation of a signal in a time domain. Since a preamble contained in a transmission frame includes a signal that has a correlation in a time domain (for example, "1" for all sub-carriers being used), carrier detection is performed by using the preamble, and existence of a carrier is determined when there is a correlation. For example, it is determined that there is a correlation when a correlation peak (which is "1" for an identical shape of a waveform) exceeds a predetermined value (for example, "0.7").

Frequency carrier detector 13 detects existence or non-existence of a carrier by using frequency characteristics of a reception signal obtained from wavelet transformer 17. Specifically, existence or non-existence of a carrier is detected by obtaining complex data of each sub-carrier and using a correlation between a plurality of adjacent sub-carriers. In the case of using a filter bank of a real coefficient, such as a wavelet, two sub-carriers are used to form a complex sub-carrier and a correlation between the sub-carriers is obtained. In other words, a phase difference comparison between adjacent sub-carriers is performed, and it is determined that there is a correlation when a correlation peak exceeds a predetermined value. The determination may also be performed by including an amplitude. Also in this case, carrier detection is performed by using a preamble contained in a transmission frame.

Controller 11, as described above, controls operations of the entire multi-carrier communication apparatus 100, and also performs carrier detection control for switching between time carrier detector 12, frequency carrier detector 13, and amplitude carrier detector 10 for activation. The carrier detection control will be described later. Since correlation calculation by time carrier detector 12 and frequency carrier detector 13 can be performed by using appropriate hardware or software, its explanation is omitted. Further, although the communication apparatus shown in FIGS. 1 and 2 includes three kinds of carrier detectors, it is possible to omit one of time carrier detector 12 and frequency carrier detector 13.

Figure 3:
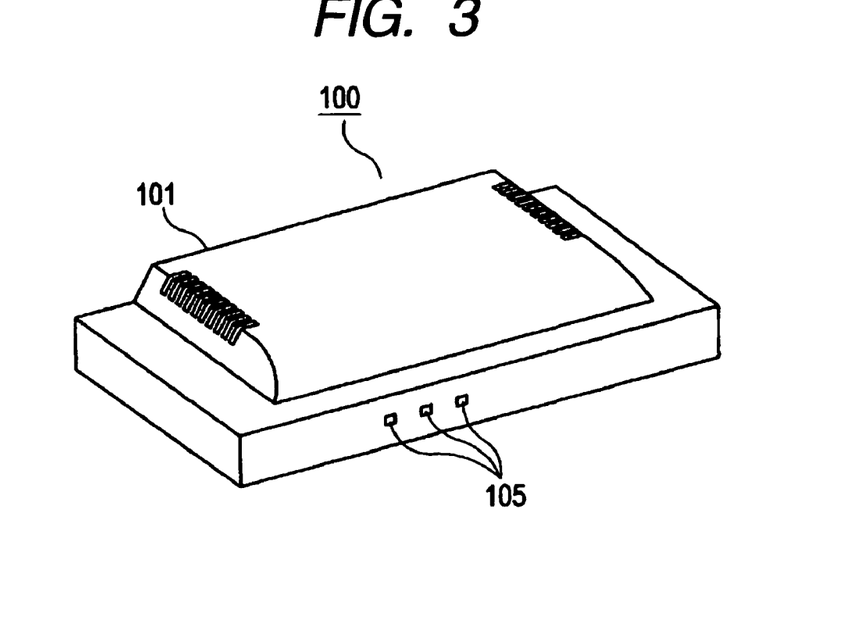
FIG. 3 is an exterior perspective view showing a front side of the multi-carrier communication apparatus according to the embodiment.
Figure 4:
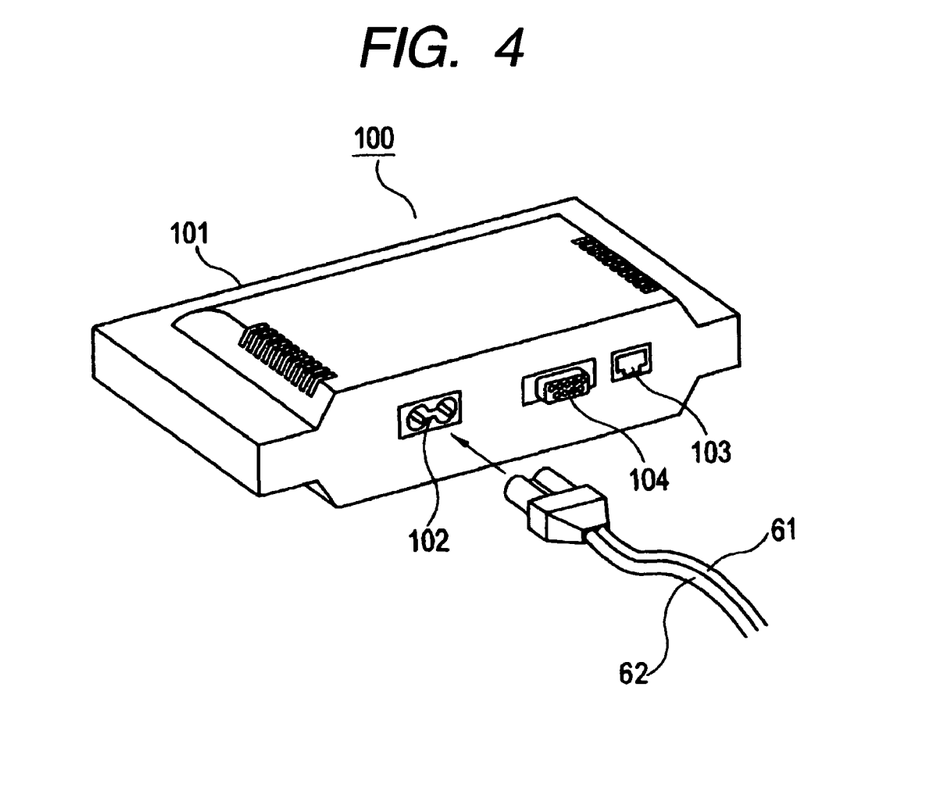
FIG. 4 is an exterior perspective view showing a back side of the multi-carrier communication apparatus according to the embodiment.

Multi-carrier communication apparatus 100 described above is provided, for example, as a modem shown in FIGS. 3 and 4. FIG. 3 is an exterior perspective view showing a front side of the multi-carrier communication apparatus FIG. 4 is an exterior perspective view showing a back side of the multi-carrier communication apparatus. Multi-carrier communication apparatus 100 has chassis 101. On the front side of chassis 101, as shown in FIG. 3, display 105, which includes LEDs (Light Emitting Diodes) and the like, is provided. On the back side of chassis 101, as shown in FIG. 4, power connector 102, modular jack 103 such as RJ45 or the like for LAN (Local Area Network) connection, and Dsub connector 104 are provided. As shown in FIG. 4, a pair of power lines 61 and 62, such as parallel cables, are connected to power connector 102. A LAN cable, which is not shown in the figure, is connected to modular jack 103. A Dsub cable, which is not shown in the figure, is connected to Dsub connector 104. As an example of a multi-carrier communication apparatus, a modem is shown in FIGS. 3 and 4. However, the multi-carrier communication apparatus is not limited to a modem having its own chassis. The multi-carrier communication apparatus can also be installed in an electrical appliance (for example, a home appliance such as a TV set). The multi-carrier communication apparatus can also be an electrical appliance (for example, a home appliance such as a TV set) that has a communication function.

FIG. 5 is a block diagram showing an example of hardware of the multi-carrier communication apparatus. As FIG. 5 shows, multi-carrier communication apparatus 100 has circuit module 200 and switching regulator 300. Switching regulator 300 supplies different voltages (for example, +1.2V, +3.3V, and +12V) to circuit module 200. Circuit module 200 includes main IC (Integrated Circuit) 201, AFE IC (Analog Front End IC) 202, low-pass filter (transmission filter) 22, driver IC 203, coupler 206, band-pass filter (reception filter) 25, memory 211, and Ethernet PHY IC 212. Power connector 102 is connected to a pair of power lines 61 and 62 through plug 400 and outlet 500.

Main IC 201, which is an example of an integrated circuit, includes CPU (Central Processing Unit) 201A, PLC MAC (Power Line Communication Media Access Control layer) block 201C and PLC PHY (Power Line Communication Physical layer) block 201B. CPU 201A has a 32-bit RISC (Reduced Instruction Set Computer) processor. PLC MAC block 201C controls a MAC layer for a transmission signal. PLC PHY block 201B controls a PHY layer for a transmission signal. AFE IC 202 includes DA converter (DAC) 21a, AD converter (ADC) 21b, and variable gain amplifier (VGA) 26. Coupler 206 includes coil transformer 3 and coupling capacitors 31a and 31b.

Digital signal processing unit 1 of FIG. 1 is substantialized by main IC 201. Controller 11 of FIG. 1 is substantialized by CPU 201A. Amplitude carrier detector 10, time carrier detector 12 and frequency carrier detector 13 of FIG. 1 are substantialized by PLC PHY block 201B. Analog circuit unit 2 is substantialized by AFE IC 202, low-pass filter (transmission filter) 22, driver IC 203, and band-pass filter (reception filter) 25 shown in FIG. 3.

Figure 6:
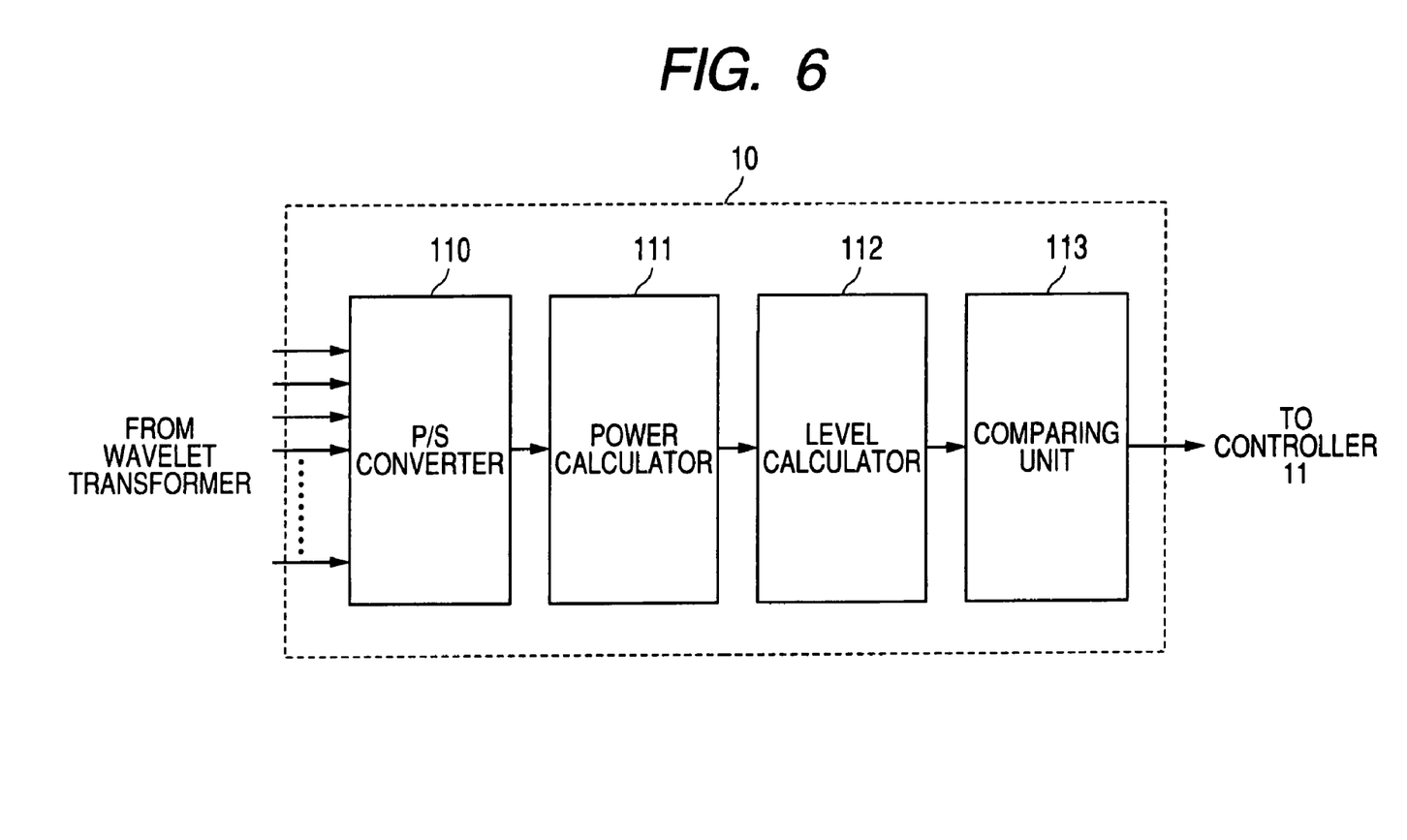
FIG. 6 is a schematic functional block diagram of an example of an amplitude carrier detector of the multi-carrier communication apparatus according to the embodiment.

FIG. 6 is a schematic functional block diagram of an example of amplitude carrier detector 10. Amplitude carrier detector 10 of FIG. 6 includes parallel-serial converter (P/S converter) 110, power calculator 111, level calculator 112, and comparing unit 113.

Figure 7:
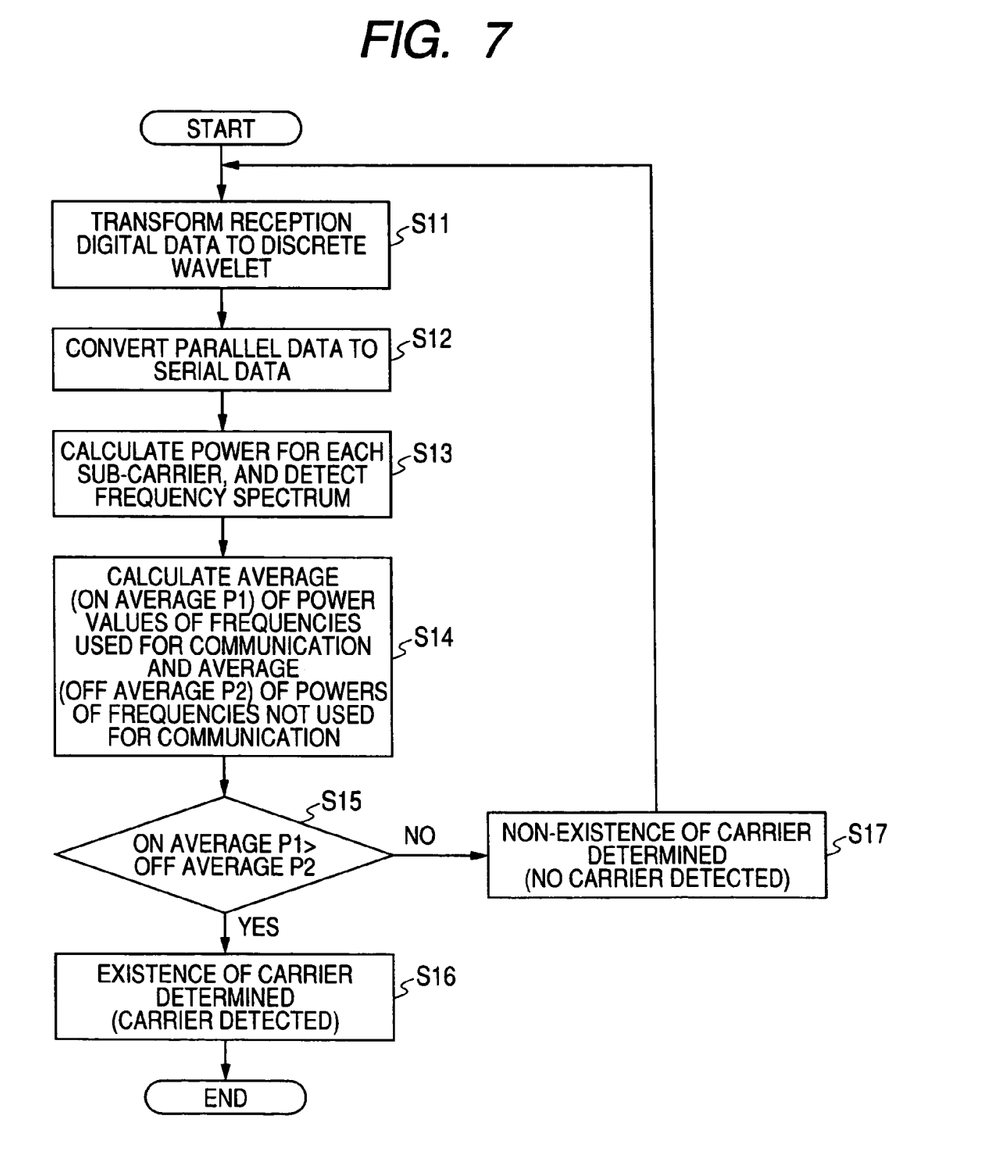
FIG. 7 is a flowchart showing an example of pattern matching according to the embodiment.

Amplitude carrier detector 10 detects existence or non-existence of a carrier by detecting a frequency spectrum of a reception signal obtained from wavelet transformer 17, and performing pattern matching between a spectrum pattern that shows frequency data used in communication and the frequency spectrum that was detected by a frequency spectrum detector. The spectrum pattern is an example of predetermined spectrum indicating the frequency used for the communication with the frequency spectrum. The frequency spectrum detector is substantiated by power calculator 111, level calculator 112, and comparing unit 113. Amplitude carrier detector 10, which performs pattern matching, will be explained in the following with reference to FIGS. 6 and 7. FIG. 7 is a flowchart showing an example of pattern matching.

First, wavelet transformer 17 transforms reception digital data obtained from reception AD converter 21b to a discrete wavelet, and generates parallel data on a frequency domain (step S11). P/S converter 110 generates digital data by converting the parallel data on the frequency domain, which are discrete-wavelet transformed by wavelet transformer 17, to serial data (step S12). Power calculator 111 calculates power for each sub-carrier based on digital data from P/S converter 110, and detects a frequency spectrum (step S13). Since the frequency spectrum only needs to show a magnitude of a signal of each frequency, it is also possible to provide an amplitude calculator that calculates an amplitude for each sub-carrier, in the place of power calculator 111. Further, in the case where power calculator 111 is capable of calculating power for a parallel signal, P/S converter 110 can be omitted.

Level calculator 112 calculates average P1 of power values of frequencies used for communication and average P2 of power values of frequencies not used for the communication based on the frequency spectrum obtained from power calculator 111 (step S14). The frequencies used for the communication are preconfigured and stored in controller 11 or memory 211 as a spectrum pattern. The spectrum pattern may be fixed or varied depending on a status of a transmission line and the like.

Figure 8A:
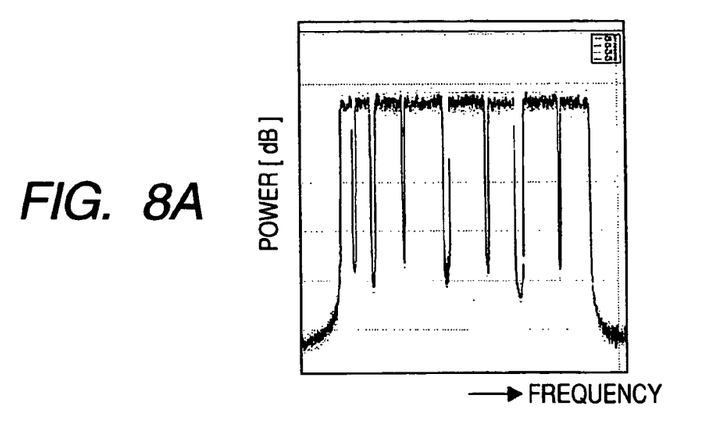
FIGS. 8(a)-8(c) show an example of a frequency spectrum of a transmission/reception signal of the multi-carrier communication apparatus according to the embodiment, and an example of a spectrum pattern used in the communication.
Figure 8B:
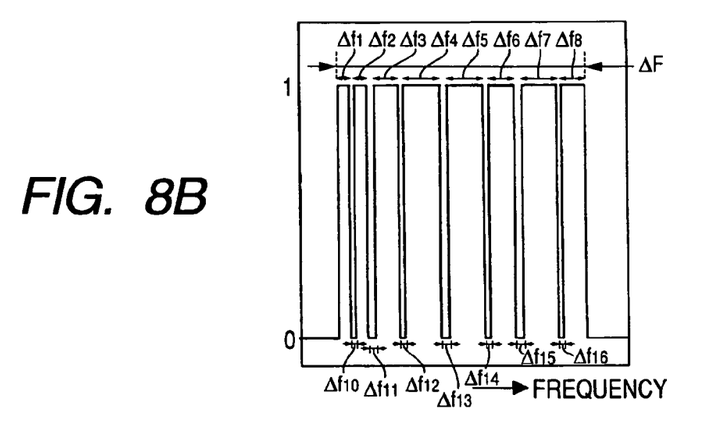
Figure 8C:
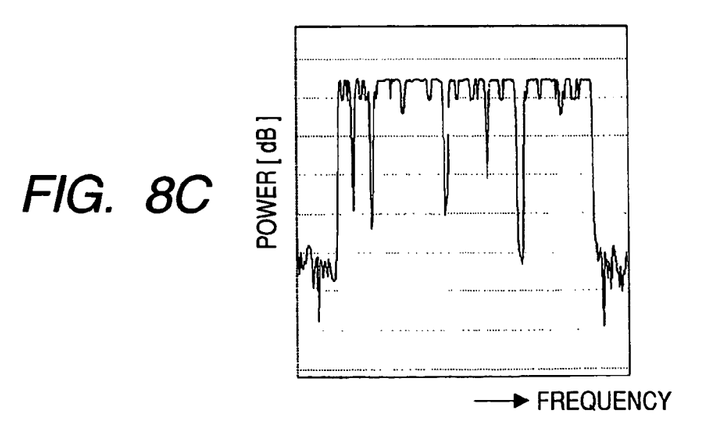

The spectrum pattern shows frequency data used for communication, and is a pattern of two-value data, for example, as shown in FIG. 8(b). FIGS. 8(a)-8(c) show frequency spectrums of a transmission signal and a reception signal and a spectrum pattern used for the communication. FIG. 8(a) shows an example of a frequency spectrum of a transmission signal. FIG. 8(b) shows an example of a spectrum pattern. FIG. 8(c) shows an example of a frequency spectrum of a reception signal. The horizontal axis in FIG. 8(b) indicates frequency. The vertical axis in the same figure indicates a two-value variable, showing whether a frequency is used for the communication. Specifically, "1 (ON)" shows a frequency used in the communication. In frequency band $\Delta F$ shown in FIG. 8(b), frequencies used for the communication are $\Delta f1, \Delta f2, \Delta f3, \ldots, \Delta f8$. "0 (OFF)" shows a frequency not used for the communication. In frequency band $\Delta F$ shown in FIG. 8(b), frequencies not used for the communication are $\Delta f10, \Delta f11, \Delta f12, \ldots, \Delta f16$. Therefore, level calculator 112 separates power values in a frequency spectrum into two groups according to whether the spectrum pattern is "1" or "0", and outputs averages of the two groups as "ON average P1" (the average of power values of frequencies used for the communication) and "OFF average P2" (the average of power values of frequencies not used for the communication), respectively. Specifically, in the frequency spectrum of the reception signal shown in FIG. 8(c), the average of frequencies $\Delta f1, \Delta f2, \Delta f3, \ldots, \Delta f8$ used for the communication is output as "ON average P1," while the average of frequencies $\Delta f10, \Delta f11, \Delta f12, \ldots, \Delta f16$ not used for the communication is output as "OFF average P2."

Comparing unit 113 compares the magnitudes of the "ON average" and the "OFF average" obtained by level calculator 112 (step S15), and outputs to controller 11 a result of the comparison as a signal indicating existence or non-existence of a carrier. "ON average">"OFF average" indicates that the power value of frequencies of which the spectrum pattern is "1" is greater, which means that a carrier exists on the transmission line. Therefore, controller 11 determines that a carrier exists when the "ON average" is greater than the "OFF average" (YES in step S15) (step S16), and that there is no carrier when the "ON average" is below the "OFF average". (NO in step S15) (step S17).

As described above, level calculator 112 and comparing unit 113 perform pattern matching between a spectrum pattern showing frequency data used for the communication and a frequency spectrum of a reception signal, and output a signal indicating existence or non-existence of a carrier. In the above-described case where the "ON average" is greater than the "OFF average," it means that the signal levels in the regions of frequencies used for the communication are high so that the probability that a carrier exists on the transmission line is high; it is therefore determined that a carrier exists.

A criterion for the determination of existence or non-existence of a carrier by using the "ON average" and "OFF average" is not limited to the above-described one based on comparing the magnitudes. For example, in the case where it is determined that a carrier exists when "ON average">"OFF average"+$\alpha$ (where $\alpha$ is a fixed positive value), a rate of false detections decreases, but a rate of missed detections increases. When deciding whether to retransmit after a transmission signal collision, it is more important to avoid missed detection than to reduce the rate of false detections. Therefore, it is preferable to determine that a carrier exists when "ON average">"OFF average."

The frequency spectrum of a transmission signal shown in FIG. 8(a) corresponds to the spectrum pattern shown in FIG. 8(b) regardless of the data to be transmitted by the transmission signal. Similarly, the frequency spectrum of a reception signal shown in FIG. 8(c) also corresponds to the spectrum pattern shown in FIG. 8(b). Therefore, by using amplitude carrier detector 10 for carrier detection, a carrier can be surely detected when a signal is transmitted on the transmission line, even when the data being transmitted are not data with correlation that are particularly transmitted.

In the above description, level calculator 112 of FIG. 6 is used to obtain averages of power values (amplitudes) of the frequencies used for communication and the frequencies not used for communication, respectively, based on a frequency spectrum. However, quantities other than an average can also be used as a determination factor for the pattern matching. For example, the above-described determination of existence or non-existence of a carrier can be performed by using a median value, a maximal value, or a representative value of the power values. The representative value is determined based on characteristics of the transmission line, such as the power value at a predetermined ranking (for example, number 4) when power values are sorted in descending order.

The above-described multi-carrier communication apparatus uses a wavelet transform and an inverse wavelet transform for the conversion between time-domain data and frequency-domain data. However, it is also possible to use a Fourier transform and an inverse Fourier transform. In this case, a Fourier transformer and an inverse Fourier transformer are provided in the places of wavelet transformer 17 and inverse wavelet transformer 16.

The following is a simple overview of operations of the multi-carrier communication apparatus shown in FIG. 1. When transmitting a signal, a digital transmission signal generated by digital signal processing unit 1 is converted to an analog signal by DA converter 21a of AD/DA conversion circuit 21. The analog signal drives communication transformer 3 via transmission filter 22, transmission amplifier 23 and transmission switch 24, and is output to power lines 61 and 62[1] connected on the secondary side of communication transformer 3.

When a signal is received, the reception signal from power lines 61 and 62 is transmitted to reception filter 25 via communication transformer 3. After gain adjustment by reception AGC amplifier 26, the reception signal is converted to a digital signal by reception AD converter 21b of AD/DA conversion circuit 21, and is converted to digital data by digital signal processing unit 1. During this process, transmission switch 24 is in an OFF state.

Figure 9:
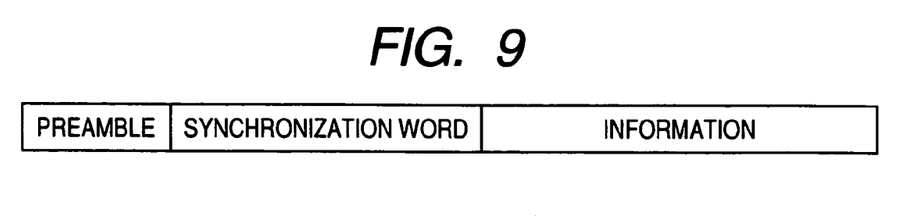
FIG. 9 shows an example of a frame format of transmission data processed by the multi-carrier communication apparatus according to the embodiment.

Next, a carrier detection operation is explained in further detail. FIG. 9 shows an example of a frame format of transmission data. The transmission data include: a preamble for carrier detection, synchronization, equalization and the like; a synchronization word for establishing a synchronization; and information to be transmitted. As described above, the carrier detection involves switching between time carrier detector 12, frequency carrier detector 13 and amplitude carrier detector 10 for activation. In the case where time carrier detector 12 or frequency carrier detector 13 operate, the preamble and synchronization word contained in the frame are used for the carrier detection. Since a certain amount of data are consecutive, the preamble and synchronization word enable simple determination of a correlation of a temporal waveform and a correlation between complex sub-carriers.

The switching of the carrier detection is controlled by controller 11. Amplitude carrier detector 10 operates after a frame is transmitted from its own apparatus, or after a demodulation failed when its own apparatus received a previous frame, or both. During this period of time, collisions of transmission signals may occur and data may be being transmitted from other communication apparatuses through the transmission line.[2] Therefore, by operating amplitude carrier detector 10, the carrier of the transmission data can be surely detected. Since the rate of false detection of the carrier detection by amplitude carrier detector 10 is high, it is preferable that the period of time for continuously activating amplitude carrier detector 10 be kept within a predetermined period of time.

During the period of time when amplitude carrier detector 10 does not operate, either one or both of time carrier detector 12 and frequency carrier detector 13 operate. It is preferable to switch accordingly between time carrier detector 12 and frequency carrier detector 13 for activation based on the characteristics that time carrier detector 12 consumes less power and frequency carrier detector 13 has high detection accuracy. For example, the switching of the carrier detection is performed according to a status of a transmission line, according to a content of information to be transmitted (transmission content) that shows a property of data such as voice data, text data, image data and the like, or according to a connecting appliance that is connected to the multi-carrier communication apparatus and utilizes a reception signal. As a specific example, in the case where a connecting appliance connected to a communication apparatus or a connecting appliance having a built-in communication apparatus requires relatively large power consumption, such as an air conditioner, a refrigerator and the like, connecting appliances are identified by using identification information capable of distinguishing one connecting appliance from other connecting appliances. As a result of the identification, in the case where a connecting appliance requires relatively large power consumption, time carrier detection is performed, thereby preventing an increase in power consumption due to the operation of the connecting appliance which requires large power consumption.

In the above, a communication system configured by connecting a multi-carrier communication apparatus to a power line is described. However, the connecting transmission line is not limited to a power line.

The present invention is useful as a multi-carrier communication apparatus and the like, which are capable of reducing the rate of missed carrier detection without degrading transmission efficiency.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-280095 filed on Sep. 27, 2005, entire content of which is expressly incorporated by reference herein.

What is claimed is:

1. A multi-carrier communication apparatus that performs multi-carrier communication, comprising:
   a frequency spectrum detector that detects a frequency spectrum of a reception signal, the frequency spectrum indicating an amplitude corresponding to a frequency; and
   a determination unit that performs a determination, based on the amplitude of the frequency used for the communication, whether a carrier exists in the reception signal,
   wherein the determination unit performs said determination after demodulation fails when the multi-carrier communication apparatus receives a previous frame.

2. The multi-carrier communication apparatus according to claim 1, wherein the determination unit compares a predetermined spectrum indicating the frequency used for the communication with the frequency spectrum, and, based on a result of the comparison, determines whether a carrier exists in the reception signal.

3. The multi-carrier communication apparatus according to claim 1, wherein the frequency spectrum detector detects a frequency spectrum by using a Fourier transform.

4. The multi-carrier communication apparatus according to claim 1, wherein the frequency spectrum detector detects a frequency spectrum by using a wavelet transform.

5. The multi-carrier communication apparatus according to claim 2, wherein the spectrum pattern uses two-value data to show whether a frequency is used for the communication.

6. The multi-carrier communication apparatus according to claim 5, wherein the amplitude carrier detector calculates an average of amplitudes of the frequency spectrum for each of the two values of the spectrum pattern, and determines whether a carrier exists when the average of the frequencies used for the communication is greater than the average of the frequencies not used for the communication.

7. The multi-carrier communication apparatus according to claim 5, wherein the amplitude carrier detector calculates a median value of amplitudes of the frequency spectrum for each of the two values of the spectrum pattern, and determines whether a carrier exists when the median value of the frequencies used for the communication is greater than the median value of the frequencies not used for the communication.

8. The multi-carrier communication apparatus according to claim 5, wherein the amplitude carrier detector calculates a maximal value of amplitudes of the frequency spectrum for each of the two values of the spectrum pattern, and determines whether a carrier exists when the maximal value of the frequencies used for the communication is greater than the maximal value of the frequencies not used for the communication.

9. The multi-carrier communication apparatus according to claim 5, wherein the amplitude carrier detector calculates a representative value of amplitudes of the frequency spectrum for each of the two values of the spectrum pattern, and determines whether a carrier exists when the representative value of the frequencies used for the communication is greater than the representative value of the frequencies not used for the communication.

10. The multi-carrier communication apparatus according to claim 1, wherein the determination unit operates after a frame is transmitted from the multi-carrier communication apparatus.

11. The multi-carrier communication apparatus according to claim 1, wherein the reception signal is a reception signal received via a power line.

12. A multi-carrier communication system wherein the multi-carrier communication apparatus according to claim 1 is connected via a wired transmission line.

13. An integrated circuit that performs multi-carrier communication, comprising:
a frequency spectrum detector that detects a frequency spectrum of a reception signal, the frequency spectrum indicating an amplitude corresponding to a frequency; and
a determination unit that performs a determination, based on the amplitude of the frequency used for the communication, whether a carrier exists in the reception signal,
wherein the determination unit performs said determination after demodulation fails when the multi-carrier communication apparatus receives a previous frame.

14. A multi-carrier communication method for performing multi-carrier communication, comprising:
detecting a frequency spectrum of a reception signal, the frequency spectrum indicating an amplitude corresponding to a frequency;
determining, based on the amplitude of the frequency used for the communication, whether a earner exists in the reception signal; and
wherein the determining step is performed after demodulation fails when the multi-carrier communication apparatus receives a previous frame.

15. A multi-carrier communication apparatus that performs multi-carrier communication, comprising:
a frequency spectrum detector that detects a frequency spectrum of a reception signal, the frequency spectrum indicating an amplitude corresponding to a frequency; and
a determination unit that performs a determination, based on the amplitude of the frequency used for the communication, whether a carrier exists in the reception signal,
wherein the determination unit performs said determination after demodulation fails.

16. An integrated circuit that performs multi-carrier communication, comprising:
a frequency spectrum detector that detects a frequency spectrum of a reception signal, the frequency spectrum indicating an amplitude corresponding to a frequency; and
a determination unit that performs a determination, based on the amplitude of the frequency used for the communication, whether a carrier exists in the reception signal,
wherein the determination unit performs said determination after demodulation fails.

17. A multi-carrier communication method for performing multi-carrier communication, comprising:
detecting a frequency spectrum of a reception signal, the frequency spectrum indicating an amplitude corresponding to a frequency; and
determining, based on the amplitude of the frequency used for the communication, whether a carrier exists in the reception signal,
wherein the determining step is performed after demodulation fails.

* * * * *